Sept. 16, 1969    W. T. DEIBEL    3,467,229
BRAKE SHOES WITH REMOVABLE AND DISPOSABLE LININGS
Filed Feb. 6, 1968    2 Sheets-Sheet 2

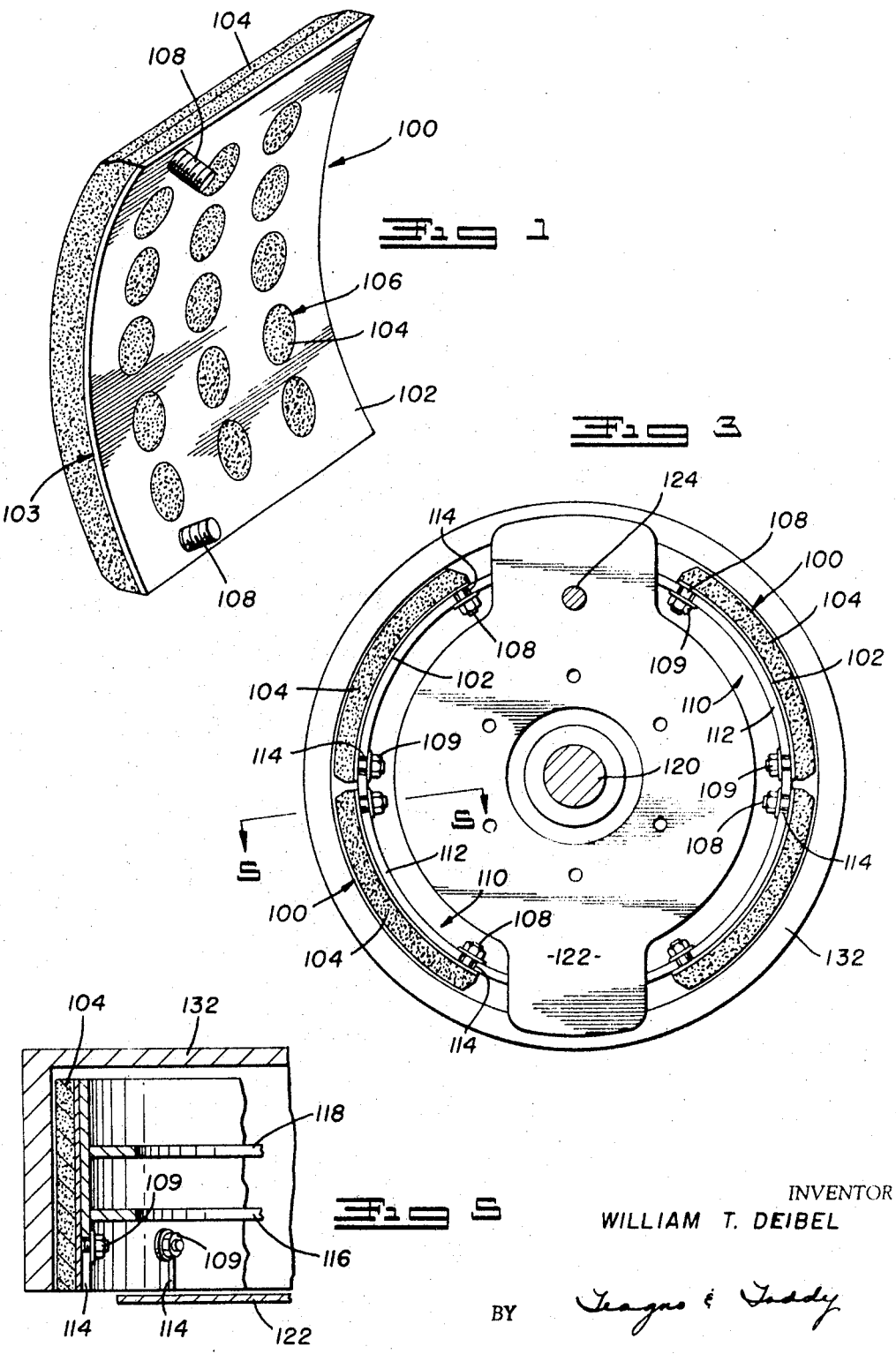

INVENTOR
WILLIAM T. DEIBEL

BY *Teagno & Teddy*

ATTORNEY

United States Patent Office 3,467,229
Patented Sept. 16, 1969

3,467,229
BRAKE SHOES WITH REMOVABLE AND DISPOSABLE LININGS
William T. Deibel, 957 Yorkshire Drive,
Marion, Ohio 43302
Filed Feb. 6, 1968, Ser. No. 703,326
Int. Cl. F16d 65/08, 65/22
U.S. Cl. 188—245      3 Claims

ABSTRACT OF THE DISCLOSURE

A brake shoe and lining assembly therefor, said brake lining being adapted to be removably secured to the brake shoe. The means of attachment for securing the removable linings to the brake shoes being such as to allow removal of the brake lining from the brake shoe without necessitating the removal of the brake drum of the vehicle.

BACKGROUND OF INVENTION

Field of invention

This invention relates to a novel brake shoe and removable linings therefor generally, and more particularly this invention relates to a novel brake shoe and a disposable lining therefor wherein the means of attachment for securing the brake lining to the brake shoe are such as to facilitate the removal of the brake lining from the brake shoe while the brake shoes are retained in a normal operating condition in a vehicle brake system.

Description of the prior art

There have been many attempts in the prior art to devise a brake shoe having a removable lining therefor and wherein the intention of the prior art was to facilitate the removal of the brake lining from the brake shoe such as when the friction material has been substantially worn from the brake lining and to further facilitate the replacement of the worn brake lining with an unworn lining. Although the invention of the present case accomplishes the object of the prior art devices as described, such is not the only feature or object of the present invention.

There have been further attempts in the prior art to devise a brake shoe and removable lining therefor such as would permit and facilitate the removal of the brake lining from the brake shoe with the brake shoe and lining in a normal operating position on a wheeled vehicle. As is known, it is a somewhat costly and time consuming operation to replace worn brake linings on a normal vehicle. It is ordinarily necessary, for example, to raise at least a portion of the vehicle from the ground, remove the tire and wheel therefrom, and to further remove the brake drum in order to view the brake assembly, including the brake shoes and the linings thereon. In conventional vehicles having drum brakes, it is then necessary to remove the brake shoes from the vehicle and to replace the worn brake shoes with an unworn replacement part. It is further known, of course, that the removal of the brake shoes from the brake support members on the vehicle is further time consuming and costly.

The prior art devices providing an easily removable lining having recognized a portion of the problem and have solved that portion by providing brake linings which are removably secured to the brake shoes and which may be removed from the brake shoe and new linings placed thereon without the removal of the brake shoe from the vehicle brake assembly. However, the expenditures of time in the removal and replacement of the tire and wheel assembly and the brake drum from the vehicle remained. A further problem caused by the necessary removal of the tire and wheel assembly and the brake drum from the vehicle is that such removal necessarily disturbs the normal operating position of several oil seal members and exposes those oil seals to damage during reassembly to the vehicle. A solution to the problem, of course, would require a brake shoe having a removable lining thereon, which lining could be removed from the brake shoe while the brake shoe remains in a normal operating position on the vehicle and further with the brake drum of the vehicle remaining in place.

None of the prior art devices presently known to applicant would allow the removal of the brake lining from the brake shoe without first removing the brake drum from the vehicle, as the means of attachment of the brake lining to the brake shoe in the prior art devices invariably requires a radial movement of the brake lining in order to remove the lining from the brake shoe.

SUMMARY OF INVENTION

This invention provides a novel brake shoe and removable lining therefor and wherein both the brake shoe and the removable lining as elements are novel The invention of the present case comprises an arcuate brake shoe having a generally T-shaped cross section and including an arcuate support web and a generally rectangular plate member secured to the web, generally perpendicular thereto and conforming to the curvature thereof. Said plate member having a plurality of slots therein along a longitudinal edge thereof and being generally perpendicular to said edge; and a disposable brake lining assembly for use with said brake shoe. The brake lining assembly including an arcuate metal sheet backing member having a curvature corresponding to the curvature of the brake shoe plate and an arcuate sheet of frictional material secured thereto; and, means for securing the brake lining assembly to the brake shoe for allowing the removal of the brake lining assembly from the brake shoe without requiring movement of the brake lining assembly radially with respect to the brake shoe.

Having thus summarized my invention, it is a primary object of this invention to provide a brake shoe and lining assembly which will permit the removal of the brake linings from the brake shoe without requiring the removal of the brake assembly, including the brake drum, from the vehicle.

It is a further object of this invention to provide a removable and disposable brake lining assembly, the removal of which is readily facilitated by the novel construction thereof and which may be further removed from the brake shoe assembly without removal of the brake shoe from the vehicle.

Another object of the present invention is to provide an improved brake shoe particularly adapted to be used with the improved brake lining assembly as described in the immediately preceding object and wherein the brake shoe is further useable with conventional types of brake linings.

Still another object of this invention is to provide a brake shoe and lining assembly wherein the brake lining may be removed by axial movement thereof only.

Having thus briefly summarized the invention of the present case and enumerated certain of the objects thereof, reference will now be made to the drawing wherein a preferred embodiment of the present invention is shown.

BRIEF DESCRIPTION OF THE DRAWING

FIGURE 1 is a perspective view of the novel brake lining assembly of the present invention.

FIGURE 2 is a perspective view of the novel brake shoe of the present invention.

FIGURE 3 is an assembly view of the improved brake shoe and brake lining assembly of the present invention installed on a vehicle.

DESCRIPTION OF THE PREFERRED EMBODIMENT

Figure 4:
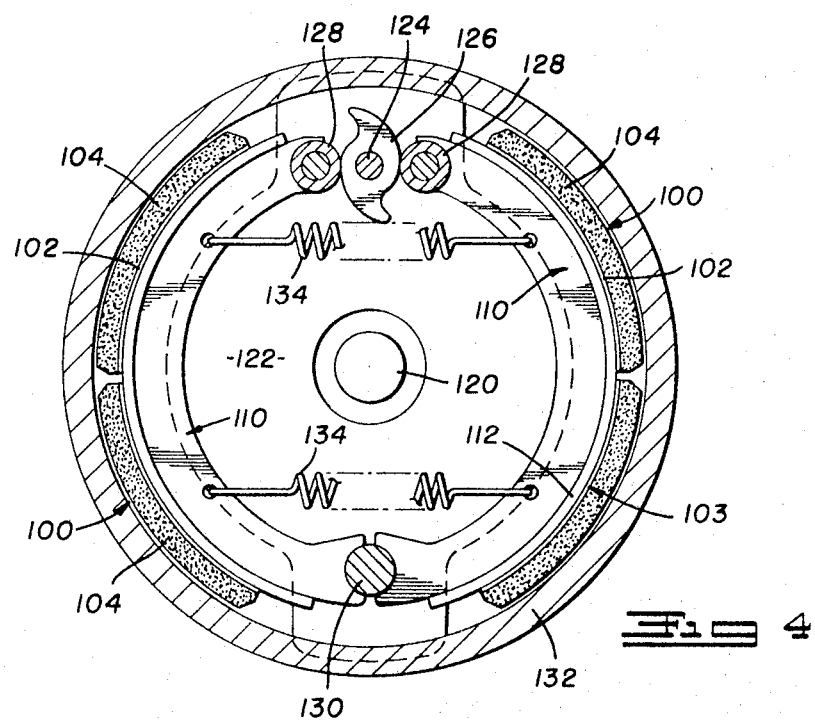
FIGURE 4 is similar to the assembly view of FIGURE 3 and further illustrates the invention of the present case.

Referring now to FIGURES 1 through 5 of the drawing for a detailed description of a preferred embodiment of the present invention wherein there is shown in FIGURE 1 an improved brake lining assembly 100 forming an important part of the present invention. In FIGURE 1 the brake lining assembly 100 comprises an arcuate generally rectangular metal backing member 102 to which there is mechanically secured by bonding or otherwise an arcuate pad 104 of suitable brake lining material such as is commonly used in the industry. As can be seen in FIGURE 1, the backing member 102 is provided with a plurality of openings 106 therethrough for receiving and supporting the brake lining material 104 and thus forming a mechanical bond therebetween.

Also secured to the metal backing member 102 is a plurality of fastening means 108 which are secured to the metal support member 102 as by welding or other appropriate joining means and which studs or other appropriate fastening members 108 extend generally radially inwardly therefrom. It is to be noted that the stud members 108 are joined to the backing member 102 as by welding such that the stud members 108 do not extend beyond the top surface 103 of the metal backing plate 102. This feature is essential as it allows the brake lining material 104 to be worn completely to the surface 103 of the metal backing member 102.

It is to be further noted in FIGURE 1 that the stud members 108 are located on the metal backing member 102 to one side of a longitudinal centerline thereof.

In FIGURE 2 there is shown a brake shoe assembly 110 which comprises an arcuate elongate generally rectangular table or plate member 112 having a plurality of slots 114 therein. The metal plate member 112 is supported on a pair of arcuate support webs 116 and 118.

The support webs 116 and 118 and the plate member 112 form a generally rigid assembly to which the brake lining assembly 100 of FIGURE 1 is particularly adapted for use therewith.

Figure 5:
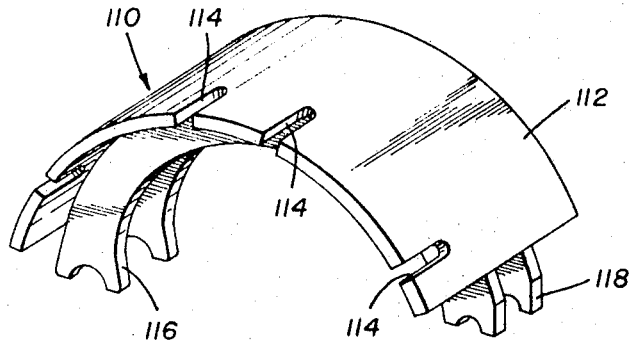
FIGURE 5 is a sectional view taken along the lines 5—5 of FIGURE 3 and illustrating still further features of the present invention.

FIGURES 3, 4 and 5 illustrate the brake lining assembly of FIGURE 1 operably secured to the brake shoe assembly 110 of FIGURE 2 and further illustrates the brake lining and brake shoe assembly in an operating condition on a vehicle.

In FIGURE 3 there is illustrated a portion of one type of conventional vehicle brake assembly. The brake assembly is mounted about a vehicle axle 120 and comprises a brake assembly support member 122 surrounding said axle 120 and non-rotatably secured to a portion of the vehicle. The brake support member 122 is commonly referred to as a spider and defines an opening through which a cam actuating shaft 124 is rotatably mounted.

FIGURE 4 is a view of the vehicle brake assembly as illustrated in FIGURE 3 taken from the opposite side as illustrated in FIGURE 3. FIGURE 4 illustrates that the brake assembly further comprises a configured cam member 126 non-rotatably secured to the camshaft 124 for causing upon rotation thereof a generally radially outward displacement of the brake shoe assembly 110 and the brake lining assembly 100 secured thereto.

The force required for displacing the brake shoe assembly 110 outwardly is lessened by the provision of friction reducing rollers 128 in contact with the cam member 126. At the end of the brake shoe assembly 110 opposite the cam member 126 there is provided an anchor pin 130 which serves to physically locate the brake shoe assemblies upon the brake support member 122 while permitting partial rotation of the brake shoe assemblies with respect to the anchor 130. Outward movement of the brake assemblies 110 and the brake lining assemblies 100 attached thereto is limited by the provision of the generally annular brake drum 132 which, as is well known, is rotatably secured to the axle 120. The function of the rotating brake drum is, of course, to provide an arcuate surface against which the brake shoe assembly 110 and brake lining assembly 100 may be forced with the resultant retardation of the brake drum due to the friction developed between the brake lining assembly 100 and the brake drum 132. The vehicle brake assembly is further provided with brake shoe return means 134 which cause the return of the brake shoes to the position in FIGURE 4 when the cam member 126 is in an inactive position. The cam member 124 is, of course, rotated by an appropriate power source (not shown in the drawings) actuated by the operator of the vehicle.

An important function of the backing member 102 is to provide a sufficient amount of support for the brake lining material 104 when the vehicle is being braked, and the backing member 102 is secured to the brake shoe assembly 110. As can be readily understood, when the vehicle is being braked, the entire surface area of the brake lining material 104 contacts the rotating brake drum 132. The resultant friction force generated between the brake lining material 104 and the rotating drum 132 would act along a line corresponding generally to the physical center of the brake lining material 104.

There exists a moment, generated by the friction forces, acting upon the brake lining material. This moment is resolved and reacted through the backing member 102 and the mating arcuate surface of the plate 112 of the brake shoe assembly 110. Therefore, the studs 108 are not required to react the torque generated during braking.

The backing member 102 further provides sufficient support for the brake lining material 104 to prevent the braking torque from destroying the brake lining material 104. It is further necessary, of course, that the backing member 102 have sufficient strength to withstand the generated moment without bending or buckling.

Since the stud members 108 are off-set with respect to the longitudinal centerline of the backing member 102, it is possible to remove the brake lining assemblies 100 from the brake shoe assemblies 110 through axial movement only with respect to the axis of rotatable drum 132.

As can be seen from either FIGURES 3 or 4, the improved brake shoe and brake lining assembly of the present invention allows the removal of the brake lining assembly 100 from the brake shoe assembly 110 by the expedient of loosening the suitable fasteners 109 on the radially extending stud members 108 and sliding the brake lining assembly 100 axially with respect to the axis of the axle and the brake shoe assembly 110. As can be seen in FIGURE 3, when the fastening means 109 are loosened on the stud member 108 it is possible to slide the brake lining assembly 100 from the brake shoe assembly 110 past the brake support member 122 and to replace the worn brake lining assembly with a replacement part by axial movement, of the brake lining only, and without the necessity of removing the brake drum from the vehicle; further, as can be seen in FIGURE 3, it is possible to replace the brake lining assembly 100 and to retighten the fastening means 109 on the stud members 108 with the brake assembly of the vehicle intact.

In view of the foregoing description of the invention of the present application, it will be immediately obvious to those skilled in the art that I have invented an improved removable brake lining assembly which represents a significant advance in the state of the art and which eliminates the time consuming and costly operation of removing and replacing the brake lining of a wheeled vehicle brake system by facilitating and providing for the removal of the brake lining assembly from the vehicle brake assembly without requiring the removal of the brake drum or any of the brake system assembly from the vehicle.

Having thus described my invention, I therefore pray for the issuance of Letters Patent on the above-disclosed and described invention.

I now claim:

1. In a brake system for a wheeled vehicle having an inoperative and an active condition, and the wheeled vehicle having a brake drum rotatably secured to the vehicle and an axle concentric within the drum,
- a brake shoe assembly including a pair of axially spaced arcuately curved support webs and a generally elongated arcuate rectangular brake shoe support plate member secured to the webs, said plate member having a plurality of slots therein extending axially and perpendicularly to a longitudinal edge, but stopping short of a web,
- a removable brake lining assembly adapted to be secured to the rectangular plate member by cooperation with said slots in the plate member, including an arcuate rectangular plate backing member with a plurality of apertures therein, an arcuate brake lining pad composed of friction material, the brake lining pad being secured to the backing member by a bonding medium in cooperation with said apertures,
- a brake support member non-rotatably secured to the vehicle for supporting the brake shoe and brake lining assemblies, the brake support member defining, in part, a clearance with the drum through which the brake lining assembly may be passed by axial movement thereof relative to the brake shoe, the brake support member coacting with the brake shoe and brake lining assembly to brake the movement of the vehicle when the brake system is activated,
- stud members adjacent each end of said rectangular plate backing member and adapted to slide axially into said slots of said brake shoe support plate member upon axial movement of said brake lining assembly relative thereto,
- and means cooperating with said stud members for loading said stud members in tension whereby said plate backing member is loaded in frictional engagement against said brake shoe, and braking torque is absorbed by said backing member and said brake shoe so that the studs are not required to react to torque generated during braking.

2. In a brake assembly for use with a wheeled vehicle having a brake drum and an axle concentric within the drum,
- an arcuate brake shoe including a pair of axially spaced arcuately curved support webs and a generally elongated arcuate rectangular brake shoe support plate member secured to the webs, said plate member having a plurality of slots therein extending axially through a longitudinal edge, but stopping short of a web,
- a removable brake lining assembly adapted to be secured to the rectangular brake shoe support plate member and including an arcuate rectangular plate backing member with a plurality of apertures therein,
- an arcuate brake lining pad composed of friction material, the brake lining pad being secured to the backing member by a bonding medium cooperating with said apertures,
- stud members adjacent to each end of said rectangular plate backing member, adapted to slide axially into said slots of said brake shoe support plate member upon axial movement of said brake lining assembly,
- and means cooperating with said stud members for loading said stud members in tension whereby said plate backing member is loaded in frictional compression against said brake shoe support plate member and braking torque is absorbed by said backing member and said brake shoe support member.

3. Apparatus as defined in claim 2 wherein the stud member comprises:
- a generally cylindrical threaded member; and
- the means for loading the stud member in tension comprise an internally threaded nut.

References Cited

UNITED STATES PATENTS

| | | | |
|---|---|---|---|
| 1,743,412 | 1/1930 | Waite. | |
| 1,941,656 | 1/1934 | Blume | 188—251 X. |
| 1,020,737 | 3/1912 | Austin. | |
| 2,291,525 | 7/1942 | Bessey | 188—234 X |

GEORGE E. A. HALVOSA, Primary Examiner

U.S. Cl. X.R.

188—250; 192—107